(Model.)
D. M. SMALL.
GAS BURNER GAGE.
No. 266,542. Patented Oct. 24, 1882.
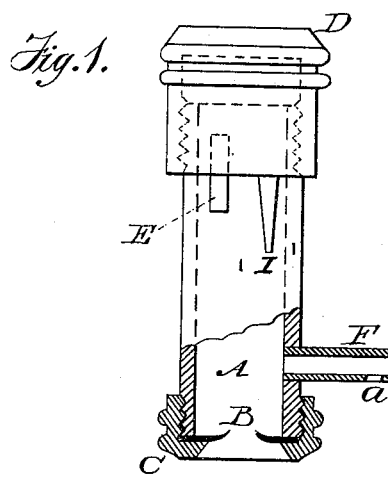
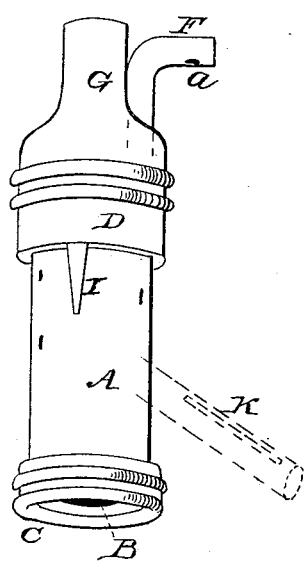
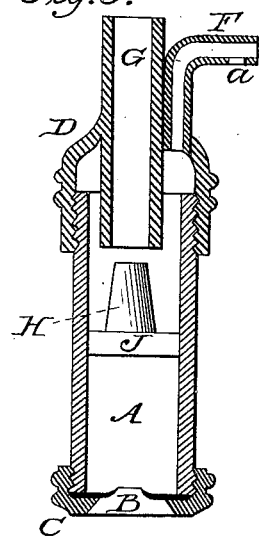
WITNESSES
J. R. Littell
F. L. Ourand
INVENTOR
Dexter M. Small

UNITED STATES PATENT OFFICE.

DEXTER M. SMALL, OF PROVIDENCE, RHODE ISLAND.

GAS-BURNER GAGE.

SPECIFICATION forming part of Letters Patent No. 266,542, dated October 24, 1882.

Application filed October 29, 1880. (Model.)

*To all whom it may concern:*

Be it known that I, DEXTER M. SMALL, of Providence, in the State of Rhode Island, have invented a new and useful Improvement in Gas-Test Meters or Gages, of the nature of which the following specification and accompanying drawings, which form a part thereof, give a full description.

My object is a convenient, cheap, accurate, and durable instrument for ascertaining or comparing the capacity of gas-burners.

In the drawings, Figure 1 is a general front view of a meter or gage illustrating the device, partially broken open to show the interior, and with dotted lines to show what would not otherwise be visible.

A represents a hollow tube, open at both ends, about three-fourths of an inch in diameter, and about three inches long. The bottom of it contains a common rubber gasket, B, held in place by the cap C, which screws onto the tube A. The top of the tube is also closed by a cap, D, which screws onto it. In the side of the tube, from near the top downward, is cut a slot about an eighth of an inch or so in width and an inch or so long, which slot is covered by the cap D when it is screwed down, and gradually uncovered as the cap D is unscrewed. A small aperture is also made near the bottom of the tube A for the little tube F, which is about one-eighth of an inch in diameter by one and one-half inch long. To ascertain the rate at which gas is passing through a burner, the instrument is pressed down over the burner so that it extends up into the tube A through the aperture in both the cap C and rubber gasket B. The gas is then turned on and ignited at the end of the small tube F, after which the cap D is gradually unscrewed until the gas ceases to burn at the tube F, or until the flame thereat is reduced to any given size, which will be the case when the slot E has been sufficiently uncovered to permit the gas to escape through it freely without pressing it out of the tube F, the natural tendency of gas being to rise, and in the most direct course. The point to which the cap D has thus to be unscrewed will indicate on the scale which surrounds the tube A the rate of passage of gas through the instrument, and consequently through the burner. The scale is made by connecting the instrument, after being otherwise all completed, with any regular test-meter, the same as with a burner, as described, and marking the points to which the cap D must be unscrewed to reduce the flame at the tube F to any given size, or to extinguish it altogether, as the different quantities of gas as ascertained by the test-meter are passing through the instrument. For convenience a little point, I, is attached to the cap D, the marks on the scale being successively made at the end of this point wherever it stops when the cap D has been sufficiently unscrewed, as described.

If care be used in making the slot E exactly the same in different instruments, and the same thread be used, the scales can all be made alike, and thus the necessity avoided of marking each one separately, as described.

The cap D, instead of screwing onto the tube A, can be made to simply slide on and be nearly as long as the tube A, if desired, as could also in this case be the slot E, which should be narrow in proportion to its length. The divisions for feet and parts of feet would then be all horizontal on the scale, and the point I would not be necessary.

Instead of a slot, E, and cap D, any other kind of an aperture and stop could be used for the purpose. It is decidedly preferable to construct the instrument as seen in the vertical section represented in Fig. 3, and perspective view as represented in Fig. 2, so that the gas can all be ignited at the top, as it is not well to ignite it at the slot E. In this case a tube, G, attached to the cap D, and a cone-shaped or tapering plug, H, fastened within the tube A by means of a horizontal bar, J, and extending up into the tube G, takes the place of the slot E. The plug H completely fills the tube G, thus closing the outlet, when the cap D is screwed way down, the outlet being gradually enlarged as the cap D is unscrewed, the same as with a slot. In this case, also, the little tube F, instead of extending out from near the bottom of the tube A, can pass up beside the tube G, as represented, or be arranged in any one of a variety of ways that will suggest themselves to any practical mechanic. A very sensitive flame for indicating the pressure is produced by inserting the little tube F into the tube A at any angle below horizontal, with a small narrow slot, K, in the top of it lengthwise of the tube, and about an inch long, as indicated by the dotted lines in Fig. 2. The end of the tube F could also be plugged up and a small aperture, $a$, be made in the under side of it, at which to ignite the gas, which produces a very steady flame.

Instead of first lighting the gas at the tube F and then enlarging the main outlet, the cap D can be first raised, if desired, and then gradually lowered until the gas will light at the tube F, or until the flame thereat be increased to the given size. It amounts to the same thing. In place of the tube F, I have used a small water-gage and various other devices for showing when the pressure was removed entirely or to any given point, which, for this purpose, amounts to the same thing; but the nature of the device is clearly shown by the instruments represented in the accompanying drawings, and therefore sufficient for this purpose.

I claim as my invention—

A device for testing the capacity of a gas-burner, or the rate at which gas under any pressure is passing through it, which consists of an instrument constructed with an inlet and an adjustable and graduated outlet for the gas, in connection with some suitable device for indicating the pressure of the gas within the instrument, for the purpose set forth.

DEXTER M. SMALL.

Witnesses:
 DAVID W. BARNEY,
 JOHN S. WHITEHOUSE.